United States Patent
Albulet

(10) Patent No.: US 7,158,580 B1
(45) Date of Patent: Jan. 2, 2007

(54) DATA PULSE SPECTRUM CONTROL

(75) Inventor: Mihai Albulet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 10/417,520

(22) Filed: Apr. 17, 2003

(51) Int. Cl.
H04B 15/00 (2006.01)

(52) U.S. Cl. ............ 375/285; 375/346; 332/107; 332/123; 455/63.1; 455/114.2

(58) Field of Classification Search ........... 375/216, 375/285; 327/74, 105, 106; 84/605, 607, 84/603, 624; 708/270, 276, 845
See application file for complete search history.

(56) References Cited

U.S. PATENT DOCUMENTS

| | | | | |
|---|---|---|---|---|
| 3,938,045 A | * | 2/1976 | Mathwich | 375/305 |
| 4,134,072 A | * | 1/1979 | Bolger | 327/106 |
| 4,962,510 A | * | 10/1990 | McDavid et al. | 375/308 |
| 5,150,048 A | * | 9/1992 | McAuliffe et al. | 714/724 |
| 5,703,540 A | * | 12/1997 | Gazda et al. | 331/16 |
| 5,856,789 A | * | 1/1999 | Huang | 713/300 |
| 6,066,967 A | * | 5/2000 | Cahill et al. | 327/107 |
| 6,298,250 B1 | * | 10/2001 | Nilsson | 455/569.1 |

OTHER PUBLICATIONS

K. Gentile, "Fundamentals of Digital Quadrature Modulation," RF Design, Feb. 2003, pp. 40-47.

* cited by examiner

*Primary Examiner*—Jay K. Patel
*Assistant Examiner*—Adolf DSouza
(74) *Attorney, Agent, or Firm*—Banner & Witcoff, Ltd.

(57) ABSTRACT

The present invention reduces adjacent channel interference for a wireless peripheral device. A direct digital synthesizer generates a waveform having intermediate angular changes during a transition time between symbol intervals. After the transition time, the direct digital synthesizer generates the waveform with an angular value that corresponds to the symbol being transmitted. In an exemplary embodiment, a generated waveform is characterized by one of two designated frequencies in response to a value of an input information bit. The waveform is further characterized by at least one intermediate frequency during a transition time between a change of the designated frequency. Another embodiment of the invention utilizes phase changes rather than frequency changes during reduce adjacent channel interference. With another aspect of the invention, methods are provided to determine waveform parameters for reducing adjacent channel power (ACP) to a maximum level of interference.

8 Claims, 16 Drawing Sheets

DATA PULSE SPECTRUM CONTROL

FIELD OF THE INVENTION

The present invention relates to controlling adjacent channel interference between wireless peripheral devices.

BACKGROUND OF THE INVENTION

With the proliferation of wireless computer peripherals, e.g. keyboards and mice, the possibility of interference of associated wireless communications from other wireless computer peripherals is increased. Typically, a wireless computer peripheral is assigned a wireless channel from a set of wireless channels, in which the wireless computer peripheral transmits to an associated computer through a corresponding interface circuit that is configured with the computer. As an example, a wireless keyboard that is associated with a personal computer (PC) may be assigned a 50 KHz radio frequency (RF) channel centered around 27.145 MHz, while a wireless mouse may be assigned another 50 KHz RF channel centered around 27.195 MHz. Because the transmitted signal on the wireless channel is time-limited, with each information bit being allocated a finite time duration, the power spectrum of the wireless channel may span over a wide frequency range with respect to the assigned wireless channel. Even though the power spectrum typically decreases as a function of the frequency difference from the center frequency of the wireless channel, the residual power in an adjacent wireless channel may be significant. If two wireless devices are in close proximity of each other while operating at adjacent wireless channels, adjacent channel interference may be induced. If the level of interference is great enough (as may be gauged by a bit error rate), data communications between each wireless peripheral device to the associated computer may be degraded and even impaired. Consequently, a user of the computer may experience input errors that may or may not be detected by software that executes on the computer and that processes the inputted information.

In addition, several computers, each having an associated set of wireless peripheral devices, may operate in close proximity of each other. For example, multiple computers are often operating in close proximity of each other in an office environment, where each worker has his or her own personal computer. As with a single computer configuration, a wireless peripheral device that communicates with the same computer as another wireless peripheral device may interfere with the other peripheral device, particularly if the wireless peripheral device is operating on an adjacent wireless channel with respect to the other wireless peripheral device. Moreover, wireless peripheral devices that are associated with different computers may interfere with each, thus degrading data communications for workers in close proximity as is typical in an office environment.

In order to reduce adjacent channel interference, a waveform that is transmitted on a wireless channel is typically shaped by a filter, which may be implemented using analog or digital techniques. By shaping the waveform, the corresponding power spectrum may be reduced in the frequency range of an adjacent wireless channel. However, the inclusion of a filter increases the complexity of a wireless peripheral device and increases cost.

The scenarios that are described heretofore show a real need in the art to provide apparatuses, methods, and computer-readable media that reduce adjacent channel interference so that data communications between a wireless peripheral device and an associated computer is more reliable.

BRIEF SUMMARY OF THE INVENTION

The present invention provides methods and apparatus that reduce adjacent channel interference for a wireless peripheral device. In an embodiment of the invention, a direct digital synthesizer generates a waveform having intermediate angular changes during a transition time between symbol intervals. After the transition time, the direct digital synthesizer generates the waveform with an angular value that corresponds to the symbol being transmitted. Analysis of different configurations of the embodiment indicates that adjacent channel power (ACP) may be reduced by adjusting design parameters, including the transition time and a number of intermediate angular changes that are inserted during the transition time. An embodiment of the invention may be applicable to wireless peripheral devices, including computer peripheral devices and wireless terminals (mobile terminals).

In an embodiment, apparatus and method provide a waveform that is characterized by one of two designated frequencies in response to a value of an input. The input is formatted as information bits, in which a symbol corresponds to an information bit. Other embodiments may associate a plurality of information bits to a symbol. The waveform is further characterized by at least one intermediate frequency during a transition time between a change of the designated frequency. In an example of the embodiment, three wireless channels are supported, where each wireless channel is associated with a wireless peripheral. The frequency of the waveform is increased by 3.2 KHz when a "1" bit is being transmitted and decreased by 3.2 KHz when a "0" bit is being transmitted for approximately 180 μsec. During a transition time of approximately 10–20 μsec, the waveform is characterized by at least one intermediate frequency, where each intermediate frequency corresponds to an associated dwell time.

Another embodiment of the invention utilizes phase changes rather than frequency changes to reduce adjacent channel interference. A variation of the embodiment supports phase shift keying (PSK) modulation, including quadrature phase shift keying (QPSK).

With another aspect of the invention, methods are provided to determine waveform parameters for reducing adjacent channel power (ACP) to less than a maximum level of interference. Waveform parameters include a frequency spacing between wireless channels, a transition time, and a number of intermediate frequencies that are inserted during the transition time.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
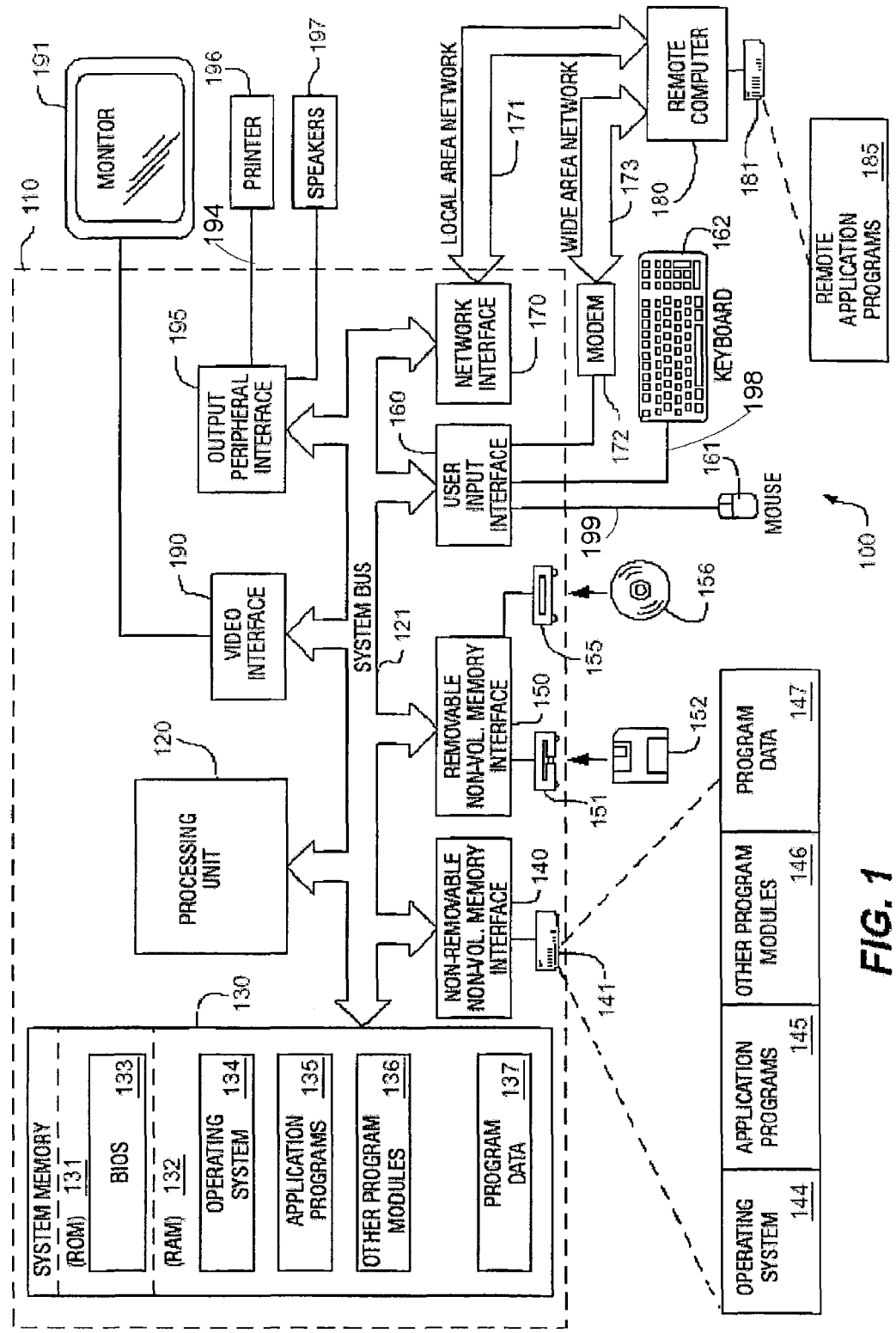
FIG. 1 illustrates an example of a suitable computing system environment on which the invention may be implemented.

FIG. 1 illustrates an example of a suitable computing system environment 100 on which the invention may be implemented. In particular, FIG. 1 shows an operation of a wireless pointer device 161, e.g. an optical wireless mouse, in the context of computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad.

In an embodiment of the invention, wireless pointing device 161 may be implemented as a mouse with an optical sensor for detecting movement of the mouse. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). In FIG. 1, wireless pointer 161 and wireless keyboard 162 communicate with user input interface 160 over a wireless channel 199 and a wireless channel 198, respectively. Wireless channels 198 and 199 utilize electromagnetic signals, e.g., radio frequency (RF) signals, infrared signals, or visible light signals. A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. In some embodiments of the invention, printer 196 may communicate with computer 110 through output peripheral interface 195 over a wireless channel 194. While wireless channels 198 and 199 operate from peripheral device (161, 162) to computer 110, which may be referred as an uplink direction, wireless channel 194 operates from computer 110 to peripheral device 196, which may be referred as a downlink direction.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

While FIG. 1 illustrates one applicable environment in which an embodiment of the invention may operate, other embodiments of the invention may be applicable to other operating environments. For example, an embodiment of the invention is applicable to a mobile terminal (wireless terminal), in which the mobile terminal transmits to a base station. In the embodiment, the mobile terminal may transmit information to the base station by phase modulating or frequency modulating a signal over a wireless channel (that is often referred as the uplink). Similarly, a base station may transmit to a mobile terminal by phase modulating or frequency modulating a signal over a wireless channel (that is often referred as the downlink). Design details that may be applied to such embodiments are discussed with FIGS. 8–15.

Figure 2:
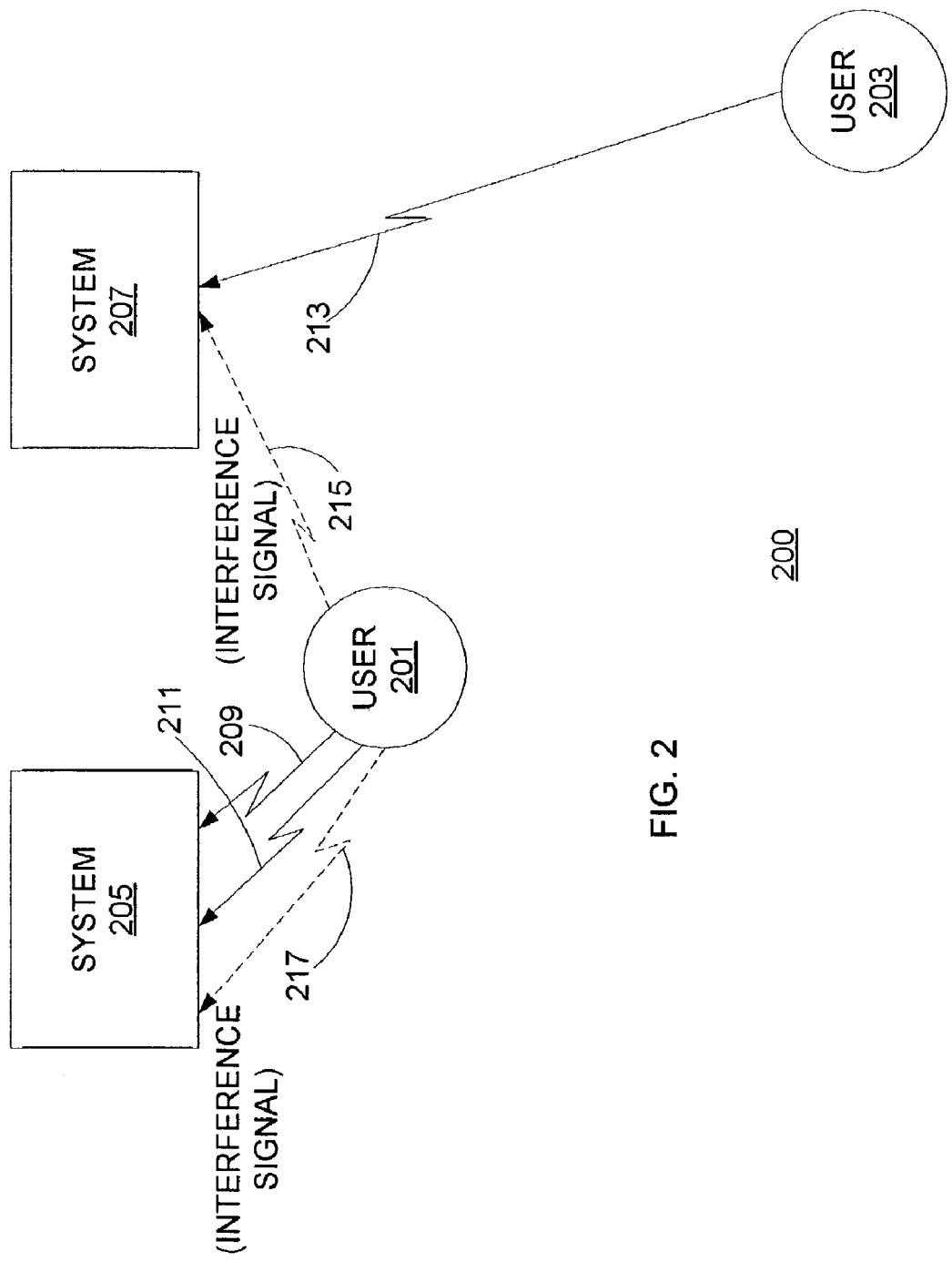
FIG. 2 illustrates signal interference that is induced by a first wireless channel on a second wireless channel.

FIG. 2 illustrates signal interference that is induced by a first wireless channel on a second wireless channel. A configuration 200 comprises a system 205 that is associated with a user 201 and a system 207 that is associated with a user 203. Users 201 and 203 may each be inputting data into computers 205 and 207, respectively, using wireless peripheral devices (e.g. mouse 161 and keyboard 162).

In the configuration shown in FIG. 2, user 201 communicates with system 205 through two different wireless peripheral devices (e.g. mouse 161 and keyboard 162) over wireless channels 209 and 211. User 203 communicates with system 207 through a wireless device over wireless channel 213. (Systems 205 and 207 may be computers in some embodiments of the invention.) In an example of the embodiment, wireless channels 211, 209, and 213 are centered at frequencies of 27.145 MHz, 27.195 MHz, and 27.245 MHz, respectively, each having a frequency bandwidth of approximately 22 KHz. Information is conveyed by a waveform by changing the frequency of the waveform so that the frequency is increased by approximately 3.2 KHz when sending a "1" bit and decreased by approximately 3.2 when sending a "0" bit. Thus, with a center frequency of 27.145 MHz, a "1" bit corresponds to 27.1482 MHz (27.145 MHz+0.0032 MHz) and a "0" bit corresponds to 27.1418 MHz (27.145 MHz−0.0032 MHz). Each bit has a time duration of approximately 200 μsec (corresponding to approximately 5000 bits per second). Other examples of the embodiment may support different center frequencies corresponding to infrared, visible light, and radio frequency (RF) power spectra. Moreover, information may have different physical formats, in which an information symbol may correspond to a plurality of bits. For example, a symbol corresponding to two bits may be represented by one of four different frequencies.

Referring to FIG. 2, an interference signal 217 represents adjacent channel interference on wireless channel 211 as induced by wireless channel 209 (where signal 217 results from the power spectrum of wireless channel 209 that exceeds the frequency allocation of the assigned channel). Thus, system 205 receives a composite signal comprising a signal transmitted over wireless channel 211 and interference signal 217. An interference signal 215 represents adjacent channel interference on wireless channel 213 as induced by wireless channel 209. Thus, system 207 receives a composite signal comprising a signal transmitted over wireless channel 213 and interference signal 215.

Variations of the embodiment may support different types of wireless peripheral devices, including computer peripheral devices and wireless terminals. Moreover, a wireless channel, in accordance with the embodiment of the invention, may support communications for the uplink direction (from the wireless peripheral), for the downlink direction (to the wireless peripheral), and for both the downlink and uplink directions.

Figure 3:
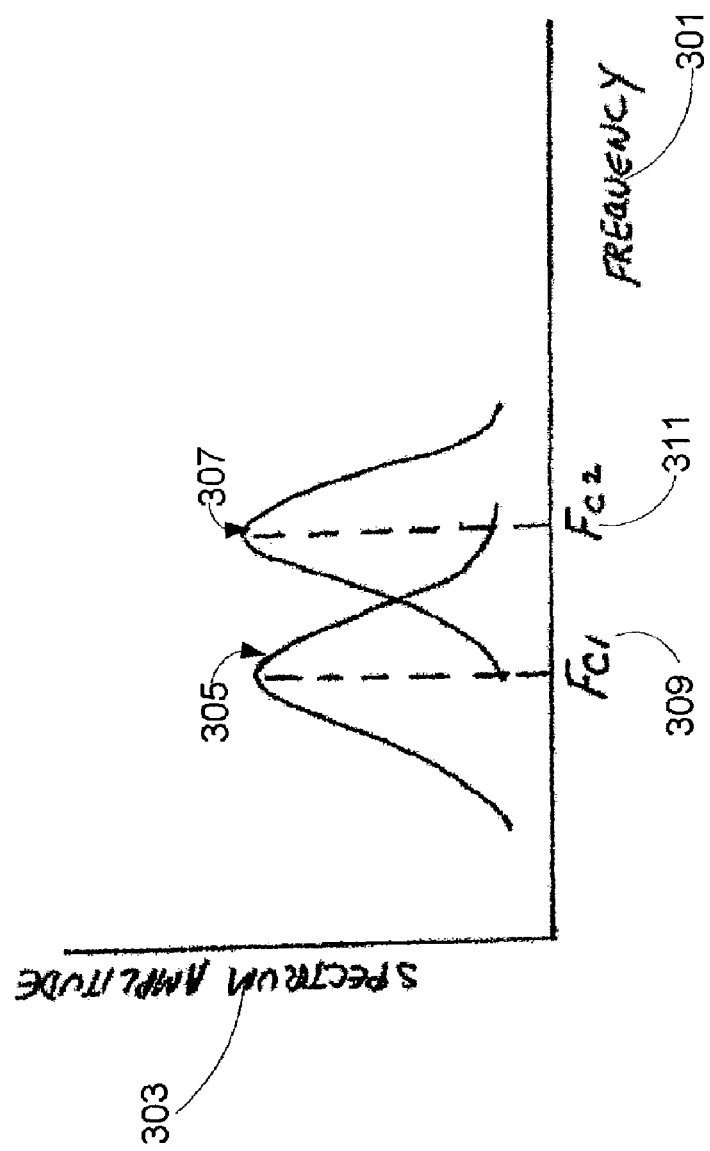
FIG. 3 shows power spectra of two adjacent wireless channels.

FIG. 3 shows power spectra 305 and 307 of two adjacent wireless channels. Power spectrum 305 has a center frequency $F_{c1}$ 309 and power spectrum 307 has a center frequency $F_{c2}$ 311. With each power spectrum, a spectrum amplitude 303 decreases as a frequency 301 increasing differs from the center frequency ($F_{c1}$ 309 or $F_{c2}$ 311). However, without waveform shaping, the spectrum amplitude 303 of power spectra 305 and 307 may be significant in the adjacent channel, where communications is degraded for the adjacent channel. With an embodiment of the invention, power spectra 305 and 307 are sufficiently constrained so that communications on the adjacent channels are not adversely affected.

Figure 4:
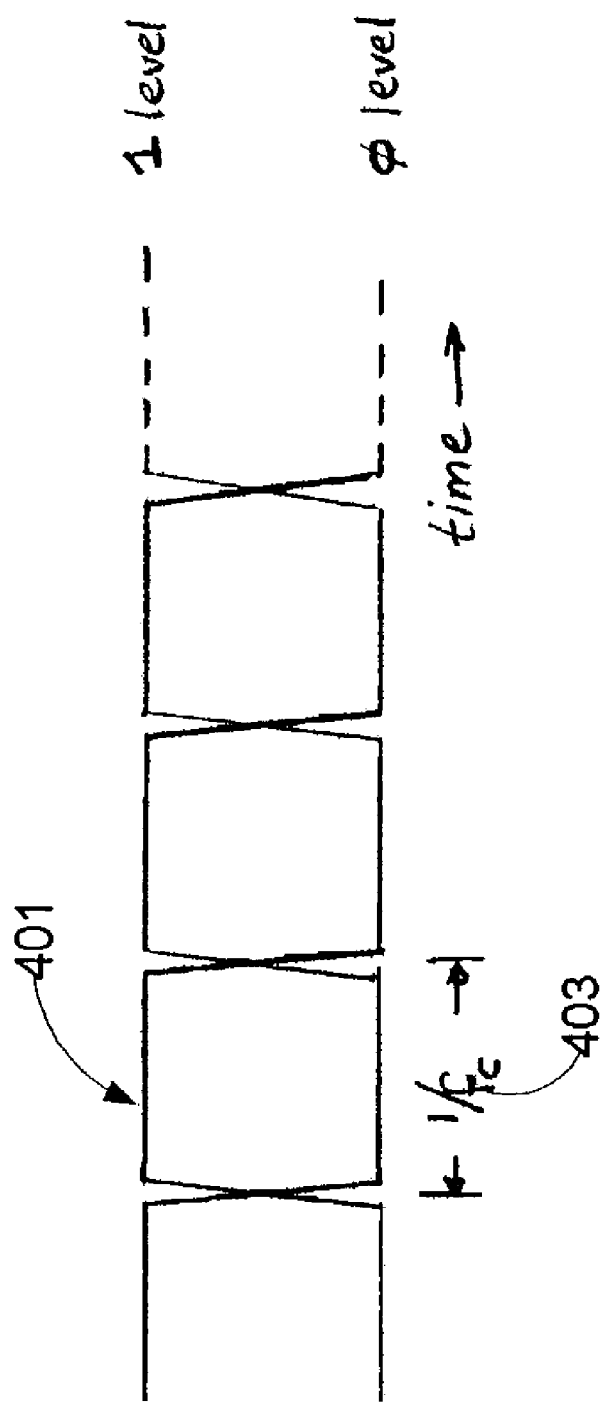
FIG. 4 shows a non-return to zero (NRZ) data waveform.

FIG. 4 shows a non-return to zero (NRZ) data waveform 401. (Waveform 401 is a baseband signal that can be modulated by a carrier signal so that the frequency characteristics of waveform 401 can be translated to another frequency.) Transitions between "0" and "1" values occur only at fixed times as determined by a data clock having a frequency $f_c$ (corresponding to a time duration 403).

Figure 5:
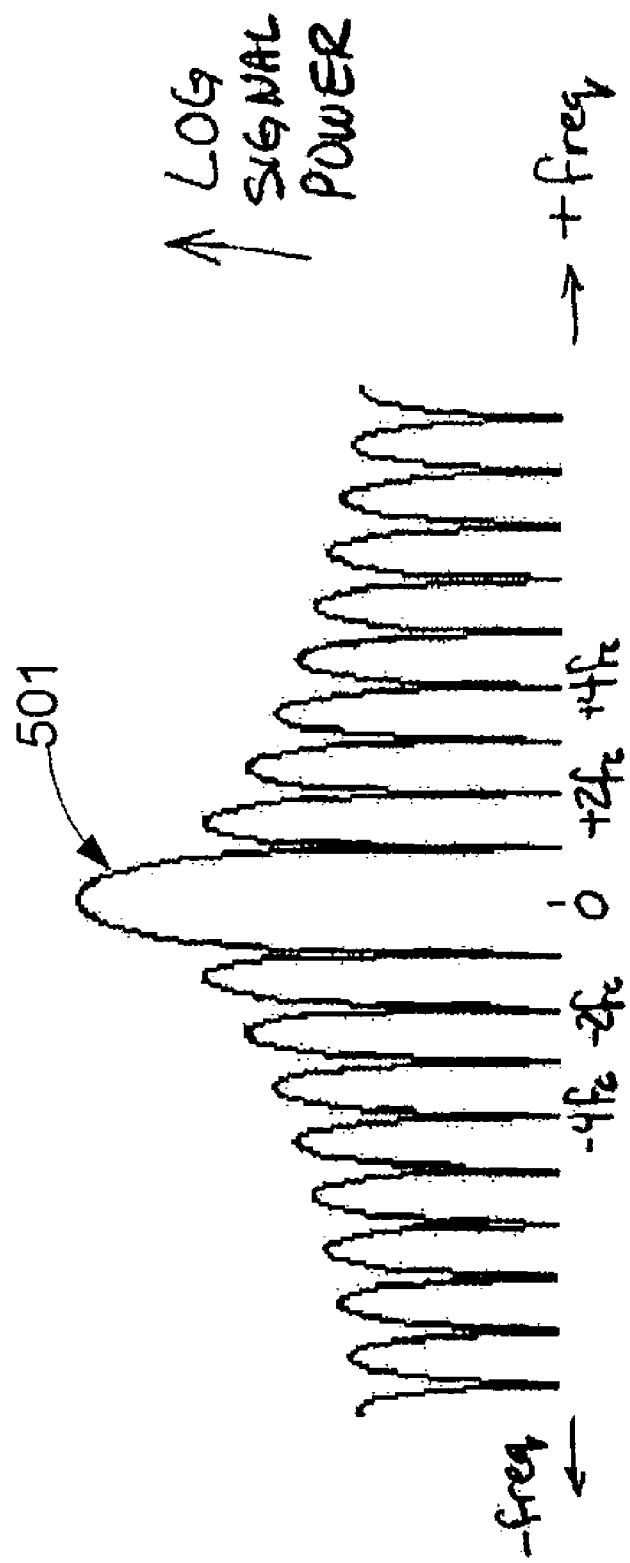
FIG. 5 shows a power spectrum corresponding to the waveform that is shown in FIG. 4.

FIG. 5 shows a power spectrum 501 corresponding to data waveform 401 that is shown in FIG. 4. An envelope of power spectrum 501 decreases with frequency. Power spectrum 501 has zeros (nulls) whenever the frequency corresponds to $n*1/f_c$, where n is an integer. The embodiments of the invention, as described in the context of FIGS. 8–16, consider engineering constraints as reflected in FIG. 5.

Figure 6:
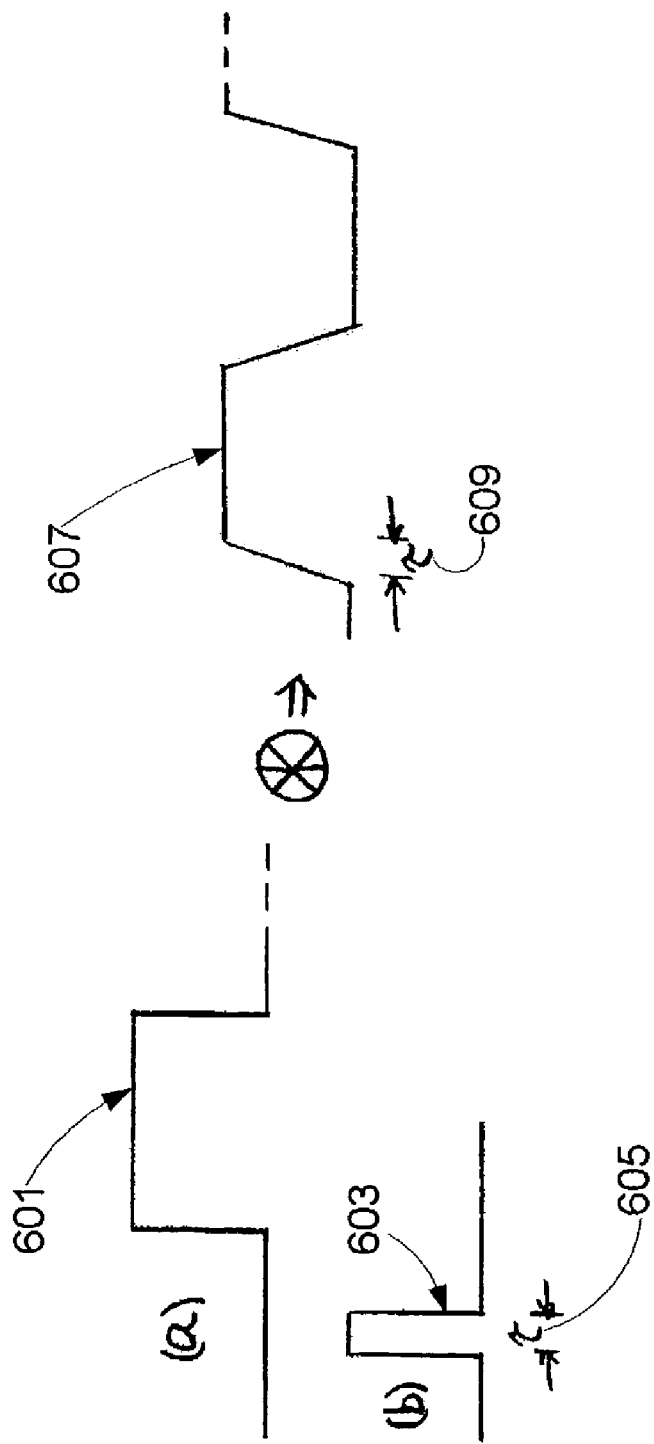
FIG. 6 shows an approach to shaping a pulse in the time domain to reduce corresponding adjacent channel power in accordance with prior art.
Figure 7:
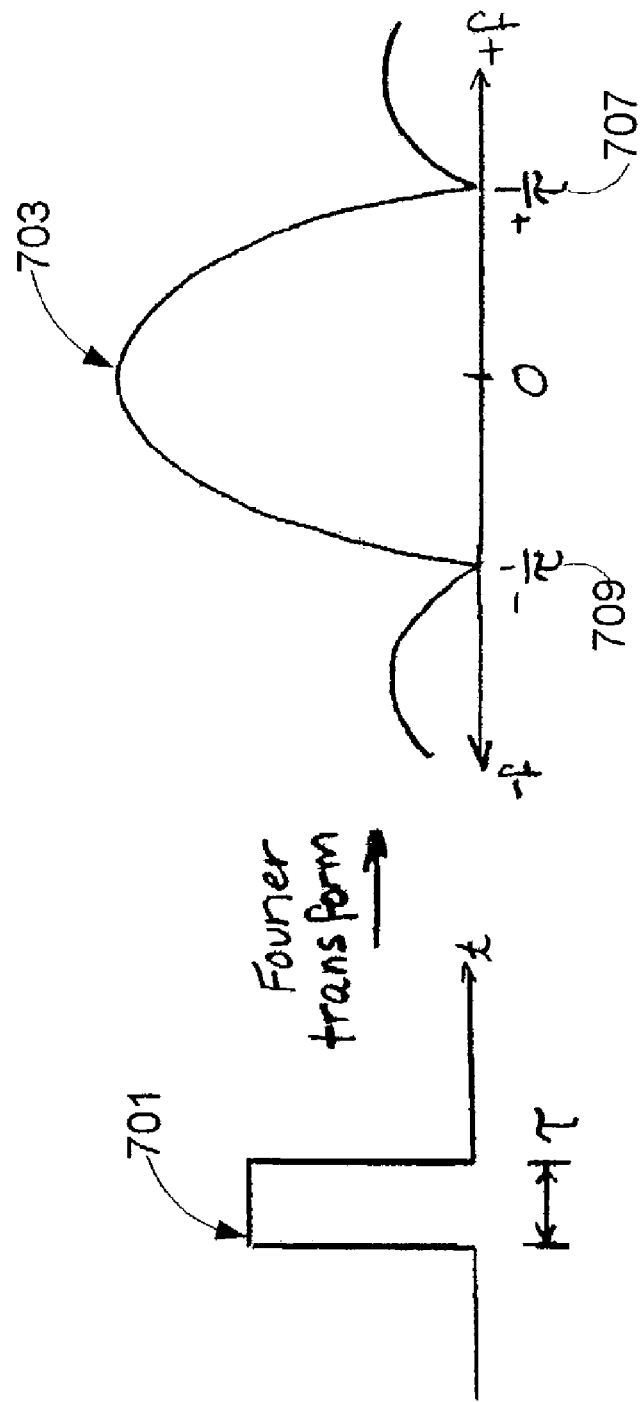
FIG. 7 shows a relationship between a single pulse waveform and a corresponding power spectrum in accordance with prior art.

FIG. 6 shows an approach to shaping a pulse 601 (with a time duration of $1/f_c$) in the time domain to reduce corresponding adjacent channel power in accordance with prior art. In the prior art, one typical approach is to reduce the adjacent channel power through controlling a risetime of data signal 607. Referring to FIG. 7 (that shows a relationship between a single pulse waveform 701 and a corresponding power spectrum 703 in accordance with prior art), consider single time pulse 701 of width (time duration) τ, with its associated power spectrum 703. If single pulse waveform 701 has a time duration of $τ_c$, the corresponding power spectrum 703 has nulls at frequency values having the form $n*1/τ_c$. Power spectrum 703 has a sin(x)/x shaped, continuous spectrum, with the first spectrum zeros located at frequencies 707 and 709 (corresponding to ±1/τ). Referring to FIG. 6, by convolving waveform 601 with waveform 603 (where the ⊗ symbol indicates the convolution operation), a trapezoidal pulse waveform 607 results, having rise and fall times equal to τ.

If two time waveforms (e.g. 601 and 603) are convolved, the power spectrum of the resulting waveform is the product of the spectra of the two waveforms. Moreover, the time domain to frequency domain relationship between single pulse waveform 701 and power spectrum 703 is applicable for both waveforms 601 and 603 and corresponding power spectra (not shown). In this case, the sin(x)/x spectral envelope (corresponding to data signal 601) is multiplied (or weighted) by another sin(x)/x envelope (corresponding to waveform 603) having zeros are much more widely spaced, since 1/τ is much greater than $f_c$. By a judicious choice of τ, the zeros can be placed, for example, at ±50 KHz, significantly reducing the signal power around the corresponding frequencies. When a data signal modulates a carrier signal whose frequency is at the center of an allocated channel, the process of modulation translates the data spectrum to center around the carrier frequency. When amplitude modulation is used, this translation is exact. For narrowband FM, the type of modulation that may be used for wireless mouse and wireless keyboard transmissions, the translation is approximate. However, the approximation is reasonably good for a low modulation index.

Figure 8:
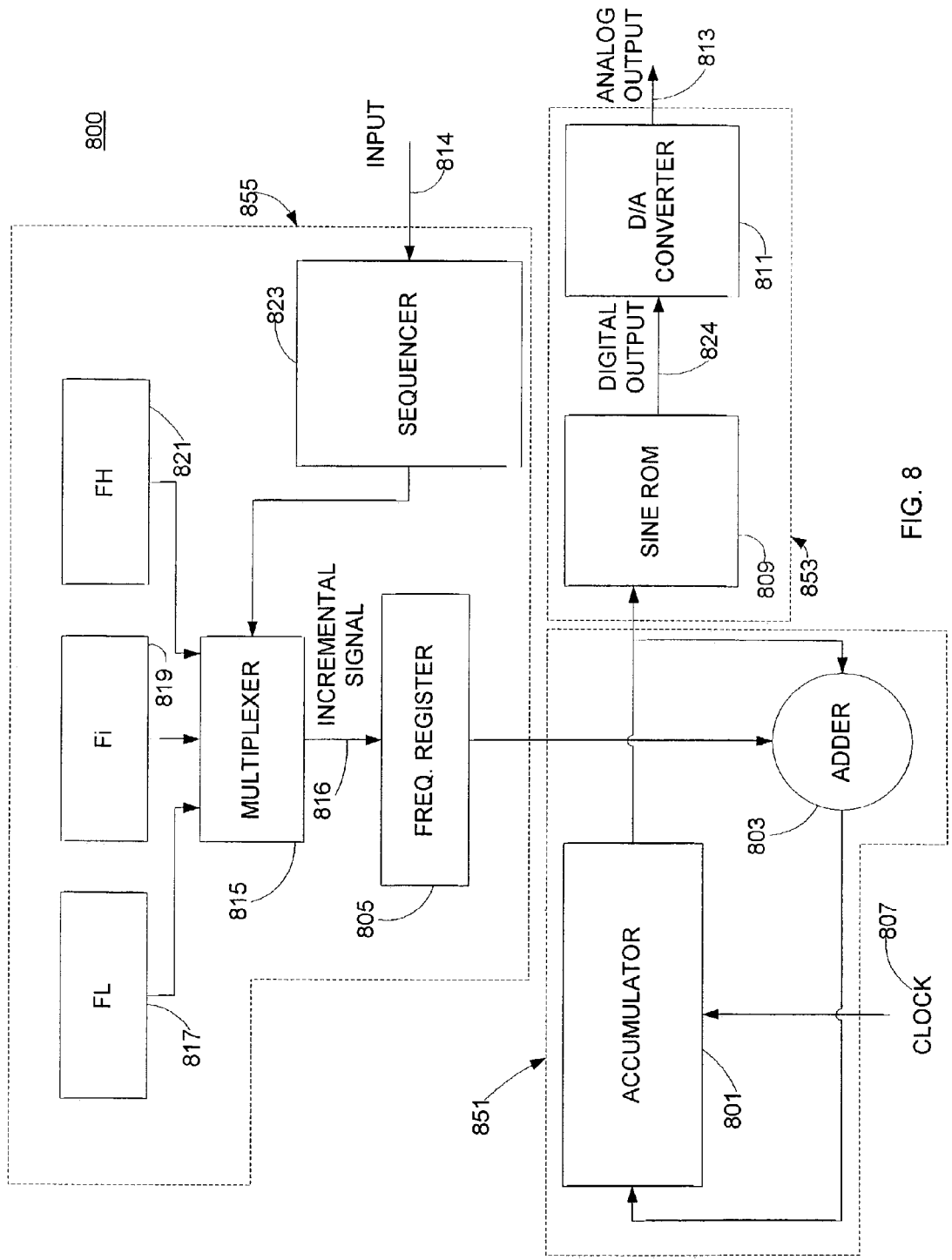
FIG. 8 shows a direct digital synthesizer (DDS) in accordance with an embodiment of the invention.

FIG. 8 shows a direct digital synthesizer (DDS) 800 in accordance with an embodiment of the invention. A digital accumulator 801 provides an accumulator output that is increased every clock cycle (as determined by a clock 807) by a accumulator change as provided by a register 805. The accumulator change is added to a previous accumulator output (i.e. the accumulator output before accumulator 801 is clocked) by an adder 803. An output of adder 803 is connected to an input of accumulator 801. The accumulator change is determined in accordance with an input 814 as will be discussed.

The accumulator output of accumulator 801 represents a phase φ of a generated digital waveform that is being synthesized by direct digital synthesizer 800. The accumulator output addresses a sine ROM 809 that converts the accumulator output to a sinusoidal signal sin(φ) corresponding to an output 824. A value at which the accumulator output overflows is considered to be a full cycle, or 360° of the output of sine ROM 809. The rate of change of the accumulator contents represents the desired frequency, by definition, as it is proportional to the value of accumulator change that is buffered by register 805, which is added each clock cycle. Output 824 may be converted into an analog output 813 by a D/A converter 811.

In the embodiment, direct digital synthesizer 800 may generate a frequency-modulated signal. For example, an upper frequency ($f_H$) and a lower frequency ($f_L$) correspond to input information bits "1" and "0" (as provided to input 814), respectively. The upper frequency and the lower frequency correspond to different accumulator changes as buffered (stored) by register 805. The accumulator change, in concert with frequency changes, are provided to register 805 as an output (designated signal) 816 of a multiplexer 815. Output 816 of multiplexer 815 is selected as one of three values that are provided by input registers 817, 819, and 821. Input register 817 corresponds to the lower frequency (i.e. an input bit "0") and input register 821 corresponds to the higher frequency (i.e. input bit "1"). The function of input register 819 will be discussed.

Figure 12:
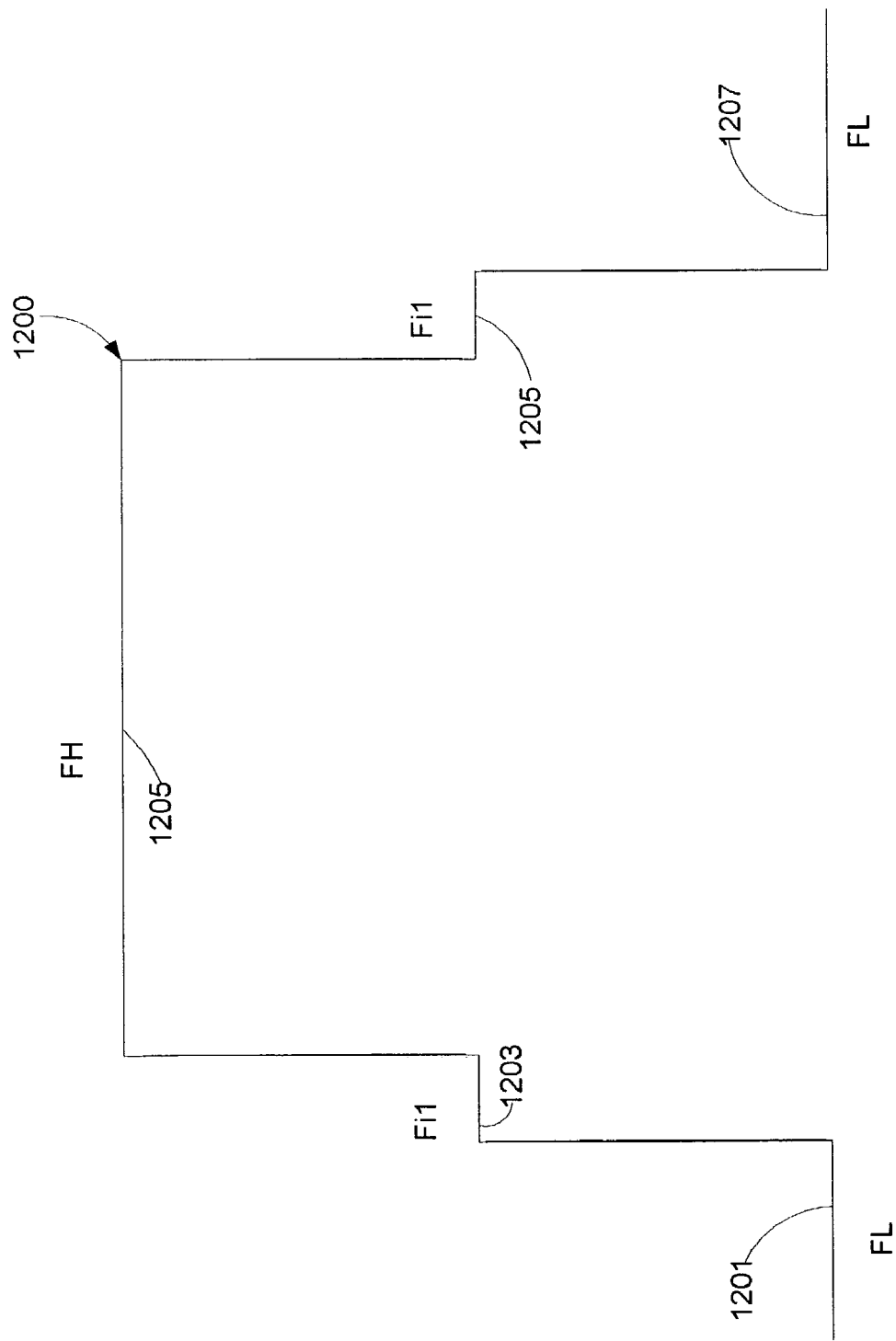
FIG. 12 shows frequency transitions (corresponding to one intermediate frequency) of an output that is generated by the direct digital synthesizer that is shown in FIG. 8.

In the embodiment, an approximation of the finite rise time signal waveform in the frequency domain is provided without the necessity of any filtering. One or more intermediate frequencies, between $f_H$ and $f_L$, are chosen, as shown in FIG. 12, and will be discussed. (In the exemplary embodiments shown in FIG. 8, one intermediate frequency, corresponding to input register 819, is supported. However, variations of the embodiment, may support a different number of intermediate frequencies, where the number depends on design objectives.) The number of intermediate frequencies, values of the intermediate frequencies, and corresponding time durations (dwell times) may be adjusted to attain a satisfactory power spectrum as will be discussed in the context of FIG. 16.

A sequencer 823 instructs multiplexer 815 to select one of three inputs (corresponding to input registers 817, 819, and 821). In the embodiment, sequencer 823 may be implemented as discrete logic circuitry, a microprocessor, and an application specific integrated circuit (ASIC). Sequencer 823 determines a time duration (dwell time) in which a selected input is provided to register 805. During a transition time (shown as time duration 1109 in FIG. 11), the frequency of waveform 813 corresponds to an intermediate frequency. With one intermediate frequency, the time duration for which input register 819 is selected corresponds to a transition time. In general, with N intermediate frequencies, the time duration associated with each intermediate frequency may be equal so that the time duration (dwell time) is approximately equal to the transition time divided by N.

While the exemplary embodiment generates a frequency-modulated waveform 813, other embodiments of the invention may generate a phase-modulated waveform. For example, rather than utilizing one of two frequencies to represent a information bit ("0" or "1"), one can represent the information bit by one of two phase changes (+180 degrees or −180 degrees).

Also, while the exemplary embodiment processes input 814 with a binary bit structure (where a information bit corresponds to a symbol), variations of the embodiment may process input 814 in which each symbol corresponds to a plurality of bits. For example if a symbol corresponds to two bits, each symbol may correspond to a frequency selected from a set of four designated frequencies. Intermediate frequencies are selected between the four designated frequencies. In general, if N bits are associated with a symbol, a set of $2^N$ different designated frequencies may be utilized. With a phase-modulated waveform, $2^N$ different designated phase values may be utilized. For example, an embodiment of the invention supports quadrature phase shift keying (QPSK), corresponding to four different designated phase values of +45 degrees, −45 degrees, +135 degrees, and −135 degrees. Intermediate phase changes are situated between the designated phase values.

Figure 9:
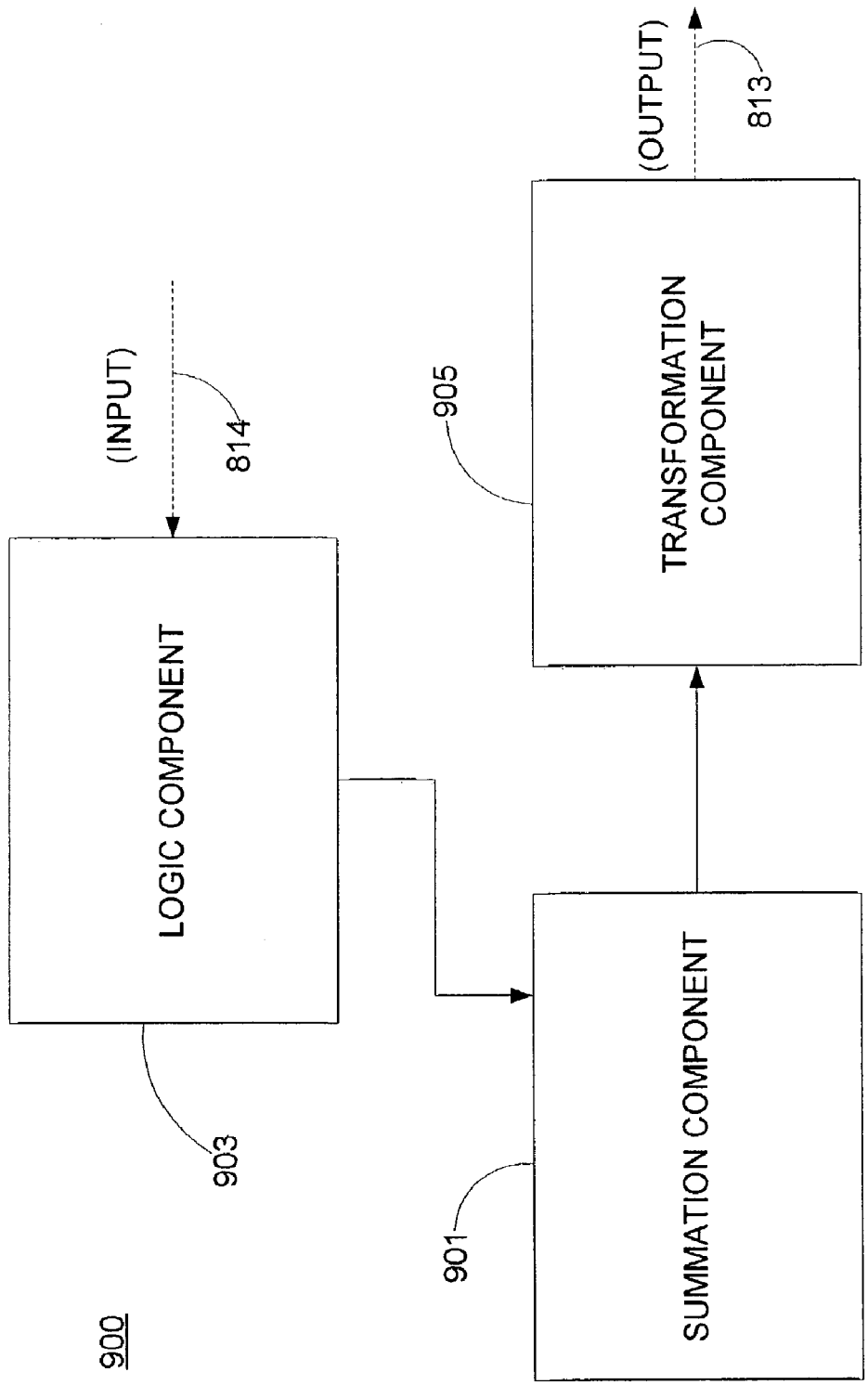
FIG. 9 shows a software architecture of a direct digital synthesizer in accordance with an embodiment of the invention.
Figure 10:
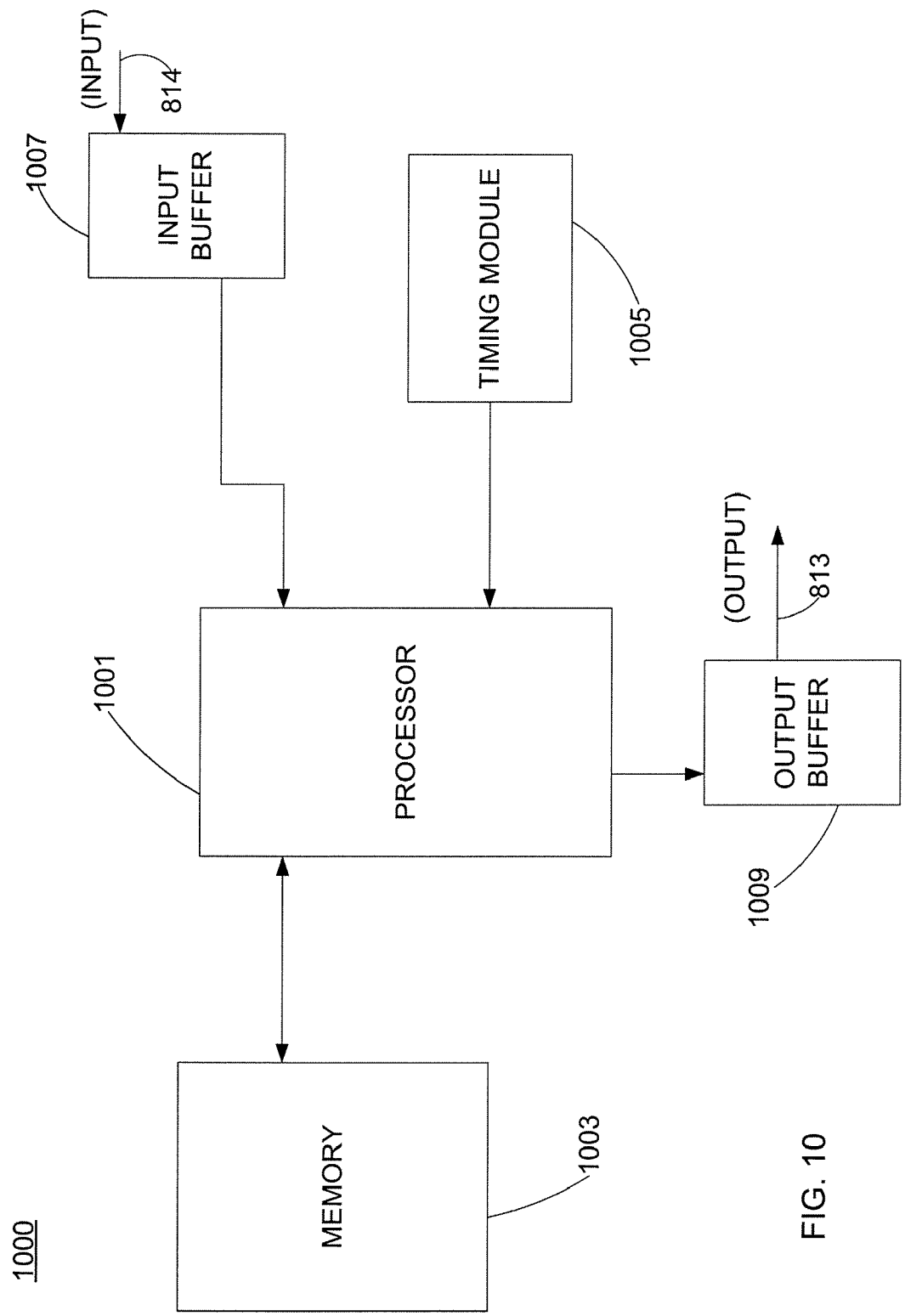
FIG. 10 shows an apparatus on which the software architecture of a direct digital synthesizer as shown in FIG. 9 may be implemented.

FIG. 9 shows a software architecture 900 of a direct digital synthesizer in accordance with an embodiment of the invention. In an embodiment of the invention, direct digital synthesizer 800 may be implemented with a computer (as shown in FIG. 10). Software architecture 900 is structured into a summation component 901, a logic component 903, and a transformation component 905. Referring to FIGS. 8 and 9, summation component 901 corresponds to block 851, logic component 903 corresponds to block 855, and transformation component 905 corresponds to block 853. Components 901, 903, and 905 may be implemented as computer-executable instructions.

FIG. 10 shows an apparatus 1000 on which the software architecture 900 of a direct digital synthesizer, as shown in FIG. 9, may be implemented. Apparatus 1000 comprises a processor 1001, a memory 1003, a timing module 1005, an input buffer 1007, and an output buffer 1009. In the embodiment, computer-executable instructions corresponding to logic component 903, summation component 901, and transformation component 905 are stored in memory 1003 and executed by processor 1001. Input 814 (as referenced in FIG. 8) is buffered by input buffer 1007, and output buffer 1009 buffers output 813. In the embodiment, output 813 is a digital approximation of an analog signal, in which computer-executed instructions support digital-to-analog (D/A) conversion. In the embodiment, processor 1001 executes the computer-executed instructions and may utilize peripheral circuitry (not shown) in order to support the D/A conversion. In the embodiment, for example, the peripheral circuitry may comprise a D/A integrated circuit. However, with variations of the embodiment, apparatus 1000 may provide digital output 824, where digital-to-analog conversion is performed external to apparatus 1000.

Figure 11:
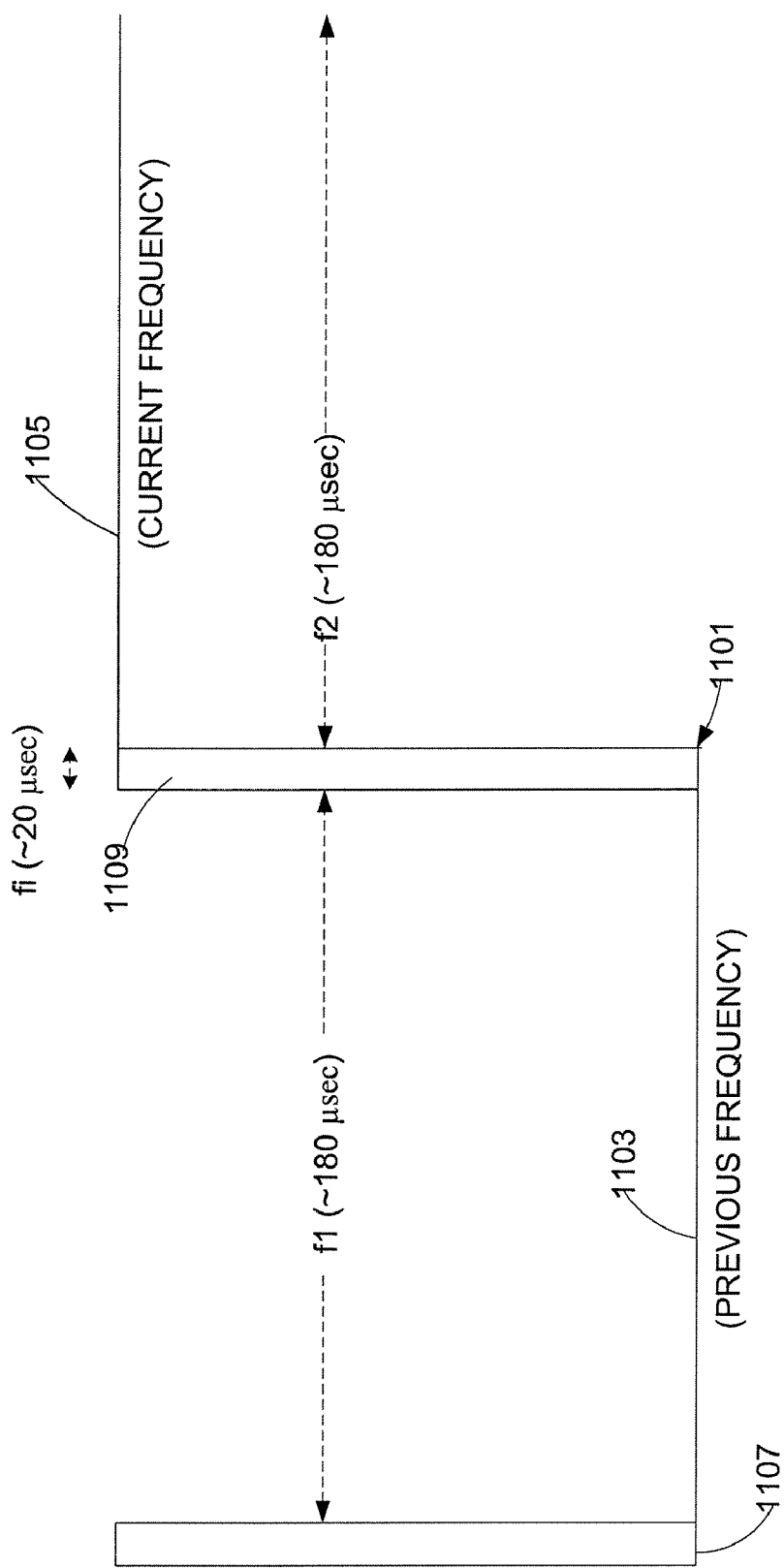
FIG. 11 shows an output in the frequency domain of the direct synthesizer that is shown in FIG. 8.

FIG. 11 shows an output 1101 in the frequency domain of the direct digital synthesizer that is shown in FIG. 8. (Output 1101 corresponds to output 813 in the frequency domain.) In the exemplary embodiment, a "0" bit is sent during a time duration 1103 and a "1" bit is sent during a time duration 1105. In the exemplary embodiment, direct digital synthesizer 800 is generating a waveform having a frequency $f_L$. However, direct digital synthesizer 800 generates at least one intermediate frequency $f_{i1}$ when output 1101 changes to $f_H$. With one intermediate frequency, $f_{i1}=(f_H+f_L)/2$. A bit is transmitted approximately every 200 μsec, which is the sum of a transition time (e.g. duration 1107 or 1109) and an information transmission time (e.g. 1103 or 1105). In the exemplary embodiment, time durations 1103 and 1105 are equal to approximately 180 μsec and time durations 1107 and 1109 are equal to approximately 20 μsec. During transition time (1107 or 1109), direct digital synthesizer 800 is generating at least one intermediate frequency. During the information transmission time (1103 or 1105), direct digital synthesizer 800 is generating either designated frequency $f_H$ or $f_L$, depending upon whether a "1" bit or a "0" bit is being transmitted.

FIG. 12 shows frequency transitions (corresponding to one intermediate frequency) of an output 1200 (shown in the frequency domain) that is generated by direct digital synthesizer 800 that is shown in FIG. 8. A time duration 1201 corresponds to time duration 1103 as shown in FIG. 11, a time duration 1203 corresponds to time duration 1109, and a time duration 1205 corresponds to time duration 1105. As more intermediate frequencies are inserted between $f_L$ and $f_H$, a ramp is better approximated in the frequency domain (as suggested by comparing FIGS. 12 and 13).

Figure 13:
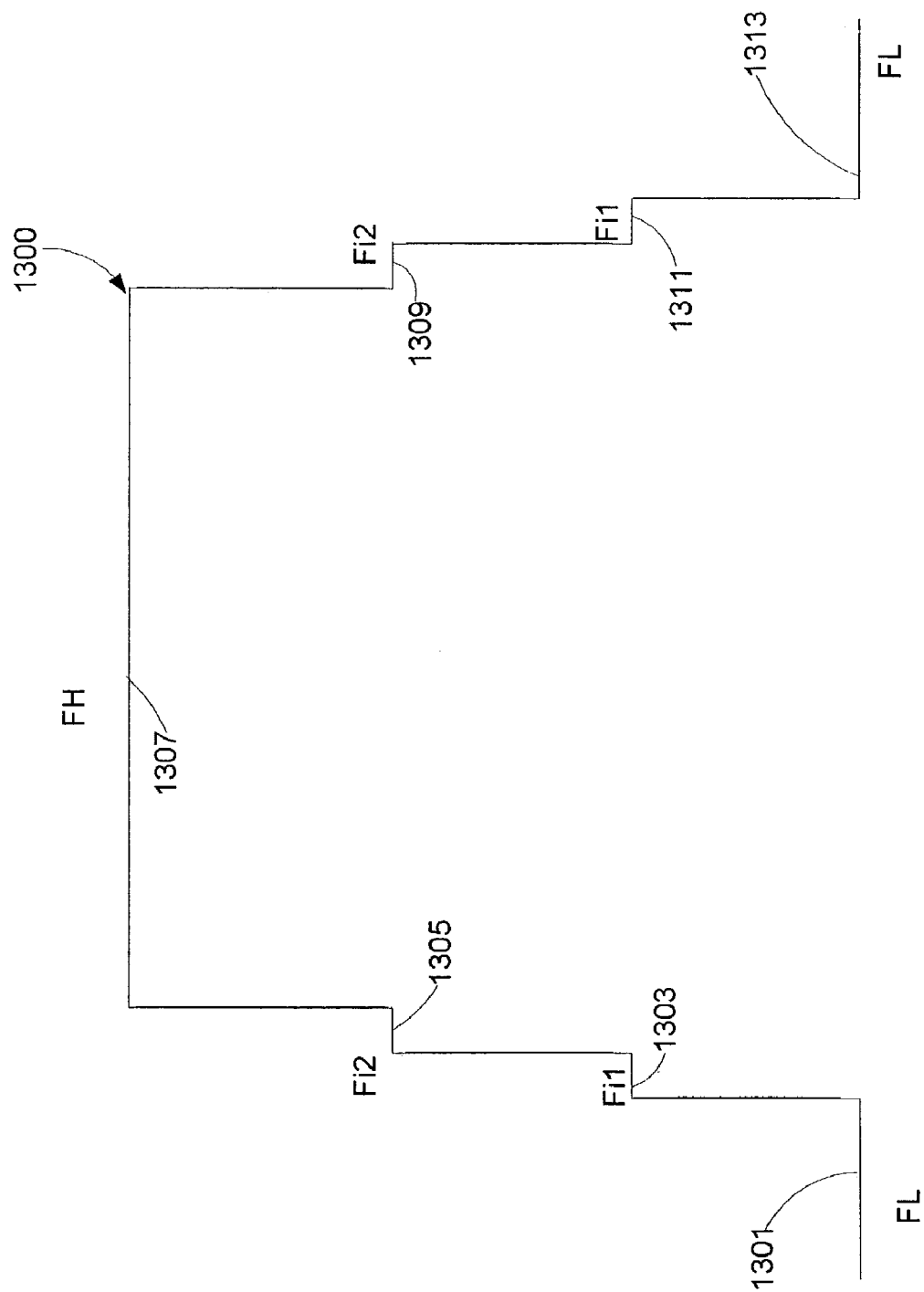
FIG. 13 shows frequency transitions (corresponding to two intermediate frequencies) of an output that is generated by the direct digital synthesizer that is shown in FIG. 8.

FIG. 13 shows frequency transitions (corresponding to two intermediate frequencies) of an output 1300 (shown in the frequency domain) that is generated by direct digital synthesizer 800. A time duration 1301 corresponds to time duration 1103, a time duration 1303 (dwell time for intermediate frequency $f_{i1}$) plus a time duration 1305 (dwell time form intermediate frequency $f_{i2}$) correspond to time duration 1109, and a time duration 1307 corresponds to time duration 1105. (The transition time is equal to the sum of the dwell times during which the waveform is characterized by intermediate frequencies $f_{i1}$ and $f_{i2}$.)

Figure 14:
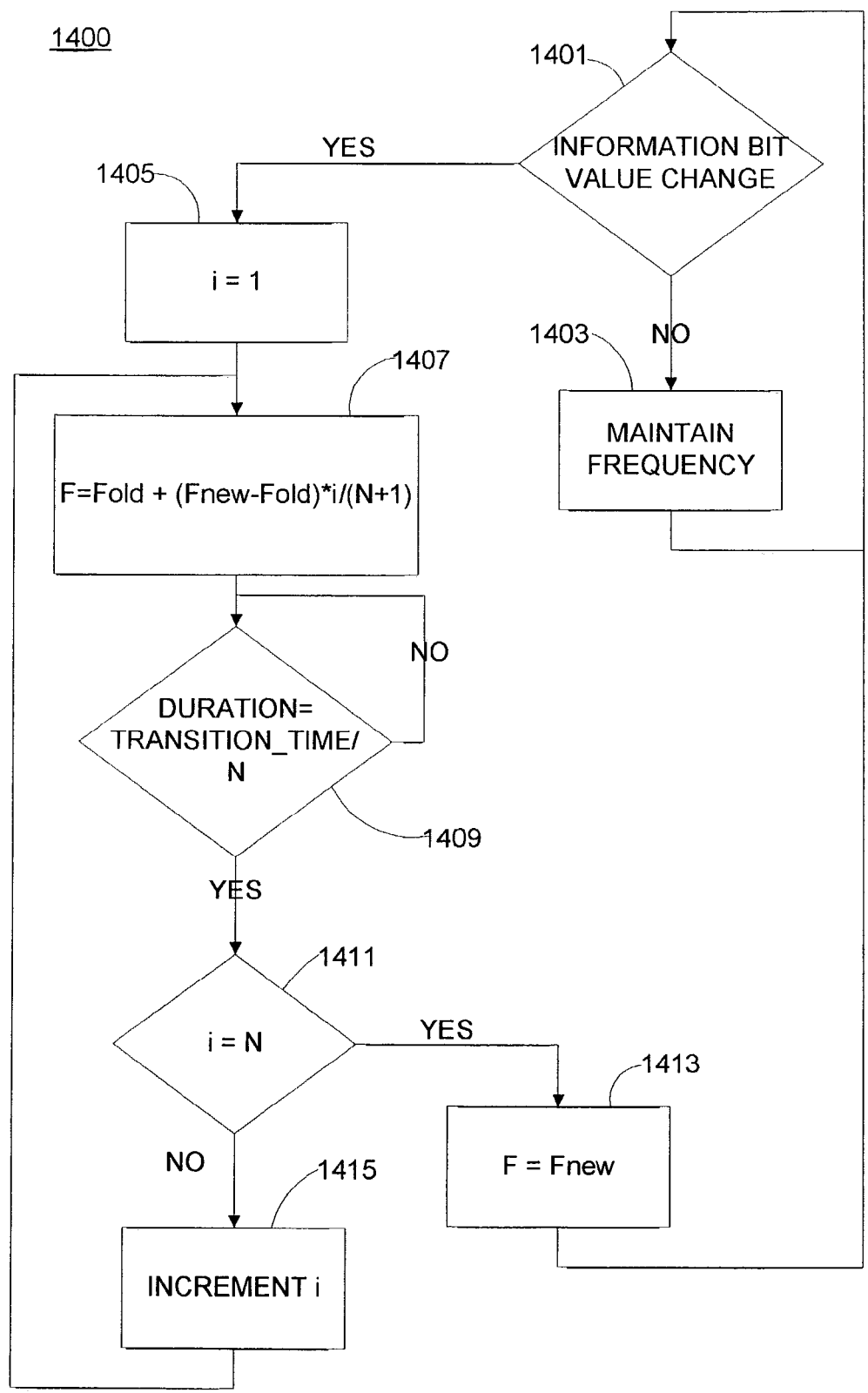
FIG. 14 shows a flow diagram of a method for generating a waveform in accordance with an embodiment of the invention.

FIG. 14 shows a flow diagram 1400 of a method for generating a waveform in accordance with an embodiment of the invention. In step 1401, process 1400 determines if an information bit value has changed (as presented to input 814 as shown in FIG. 8). If not, direct digital synthesizer 800 maintains the frequency of output 813 in step 1403. For example, if a previous information bit equals "1" and the subsequent information bit equals "1", direct digital synthesizer maintains the output frequency at the designated frequency $f_H$.

If the information bit value changes, step 1405 sets an index of an intermediate frequency to 1. In step 1407, direct digital synthesizer 800 generates an intermediate frequency approximately equal to:

$$f = f_{old} + (f_{new} - f_{old}) * i/(N+1) \quad \text{(EQ. 1)}$$

where $f_{old}$ is the designated frequency associated with the previous information bit (e.g. $f_H$ for "1" and $f_L$ for "0"), $f_{new}$ is the designated frequency associated with the pending information bit, and N equals the number of intermediate frequencies being inserted during the transition time. The intermediate frequency calculated in step 1407 is transmitted for a time interval approximately equal to the transition time divided by N as determined by step 1409. (In the embodiment of the invention, each intermediate frequency is transmitted for equal times. Thus, the dwell time for each of the N intermediate frequencies is approximately equal to (transition_time)/N. However, other embodiments may transmit intermediate frequencies for different time durations.) If all the intermediate frequencies have been transmitted, as determined by step 1411, direct digital synthesizer generates a designated frequency ($f_{new}$) corresponding to the pending information bit (e.g. $f_H$ or $f_L$ for the exemplary embodiment). If not, the index is incremented in step 1415 so that the next intermediate frequency may be generated in steps 1407 and 1409).

In a variation of the embodiment, if the information bit value does not change, as determined in step 1401, intermediate frequencies may be generated in steps 1407 and 1409, in which the intermediate frequencies are equal to the designated frequency associated with the information bits (e.g. $f_H$ or $f_L$). In fact, Equation 1 simplifies in such a case, where $$f = f_{old} = f_{new} \quad \text{(EQ. 1a)}$$

Figure 15:
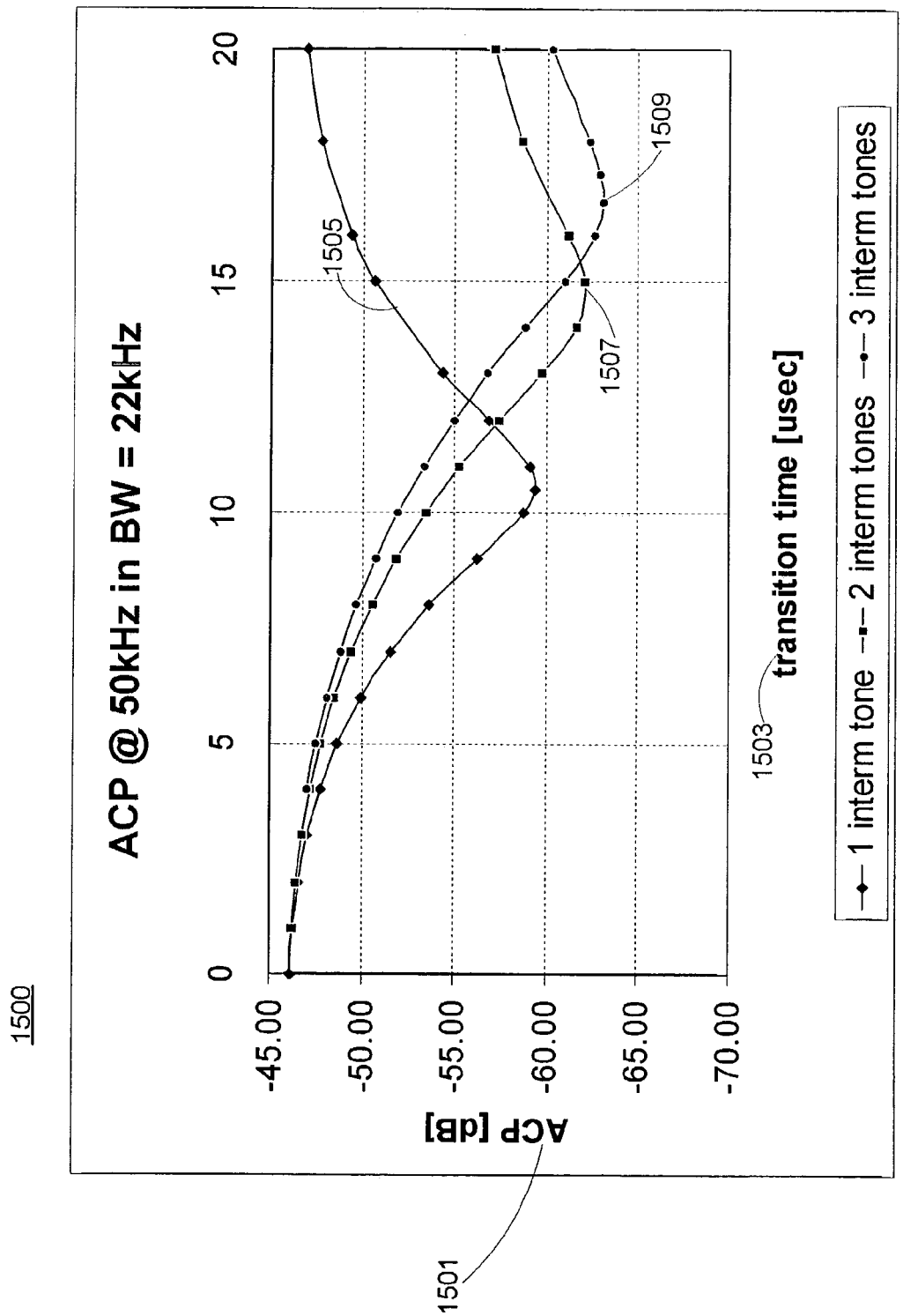
FIG. 15 shows a relationship between adjacent channel power and a transition time corresponding to an embodiment of the invention.

FIG. 15 shows a relationship between an adjacent channel power (ACP) 1501 and a transition time 1503 corresponding to an embodiment of the invention. FIG. 15 was determined through a simulation, in which three cases where determined with one intermediate frequency (curve 1505), with two intermediate frequencies (curve 1507) and three intermediate frequencies (curve 1509) Because of the additional complexity of these waveforms and the complexities of frequency modulation, it is convenient to analyze the resultant spectra by numerical methods. Adjacent channel power 1501 is determined at ±50 KHz from the carrier is shown in FIG. 15. In plot 1500, ACP 1501 is the adjacent channel power measured in a bandwidth of 22 KHz, which is a typical receiver IF bandwidth. The theoretical value for rectangular data waveforms is about 46 dB, using a frequency shift ($f_H - f_L$) of 2*3.2 KHz. Referring to FIG. 15, for a single intermediate frequency, an approximate 11 μsec transition time provides the most spectrum reduction with respect to other transition times. However, as more intermediate frequencies is inserted, an optimum transition time of 20 μsec is approached, corresponding to a trapezoidal waveform (in the time domain) with nulls at approximately 50 KHz from the center frequency.

In the exemplary embodiment, with one intermediate frequency, as shown for curve 1505, ACP 1501 is approximately equal to −60 dB with a transition time of 11 μsec, while ACP 1501 is approximately equal to 46 dB with a transition time of approximately 0 μsec and 20 μsec. Moreover, ACP 1501, as shown in curve 1509, may be reduced to approximately −63 dB with three intermediate frequencies corresponding to an approximate transition time of 17 μsec. Thus, an engineer should be cognizant of various design parameters when engineering a wireless peripheral in accordance with an embodiment of the invention. However, as is suggested by FIG. 15, ACP 1501 cannot be reduced indefinitely by increasing the number of transition frequencies.

Figure 16:
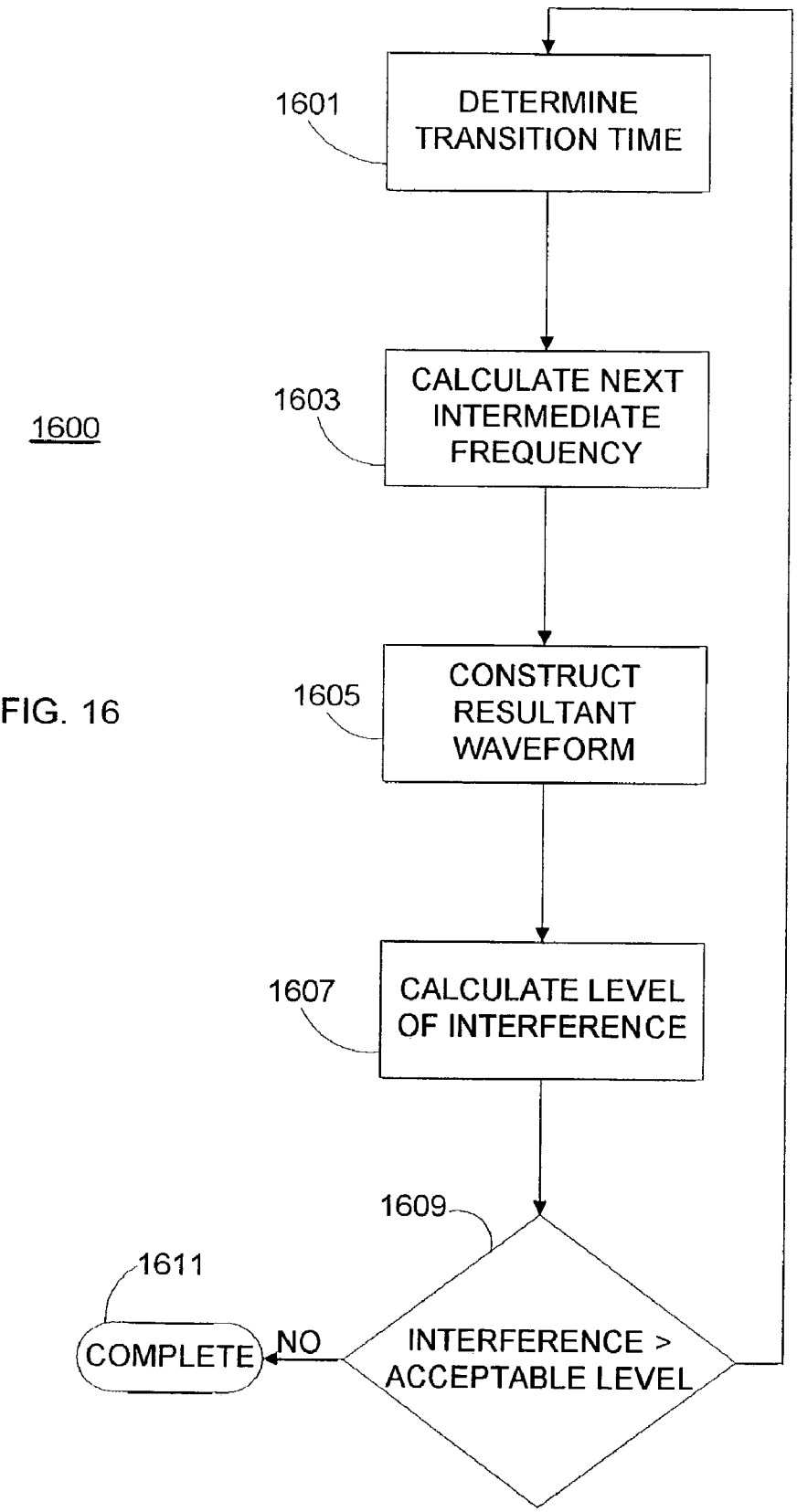
FIG. 16 shows a method for determining transition parameters in accordance with an embodiment of the invention.

FIG. 16 shows a method 1600 for determining transition parameters in accordance with an embodiment of the invention. In step 1601, a transition time is determined. In determining the transition time, the engineer should also consider requirements for clock acquisition. For example, as the transition time increases, the difficulty of acquiring the clock of the transmitted signal typically increases. In method 1600, a first iteration of process 1600 may utilize a minimum transition, e.g. 10 μsec in the exemplary embodiment. In step 1603, an intermediate frequency with an associated dwell time is determined. In step 1605, the resultant waveform is simulated, and the corresponding ACP is calculated. If the determined ACP exceeds a maximum ACP, as determined in step 1609, step 1601 is repeated. Additional intermediate frequencies may be inserted and/or the transition time may be increased. Steps 1601–1609 may be repeated to reduce the ACP. However, process 1600 may not be able to achieve the target ACP. If that is the case, process 1600 may provide the "best" parameter set that has the smallest associated ACP for all of the parameter sets that are simulated.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for determining a level of interference in an adjacent wireless channel for a frequency modulated (FM) signal that conveys information from a wireless peripheral device in the adjacent wireless channel, the method comprising:

(a) determining a transition time between a previous designated frequency and a current designated frequency, wherein the current designated frequency is indicative of a pending symbol of information;

(b) calculating a first intermediate frequency that is between the previous designated frequency and the current designated frequency;

(c) constructing a resultant waveform, wherein the resultant waveform is associated with the first intermediate frequency during the transition time; and (d) calculating the level of interference for the resultant waveform.

2. The method of claim 1, wherein the pending symbol corresponds to a pending information bit.

3. The method of 1, further comprising:

(e) if the level of interference is greater than an acceptable level, calculating another intermediate frequency;

(f) constructing another resultant waveform, wherein the other resultant waveform is associated with the first intermediate frequency and the other intermediate frequency for a portion of the transition time; and (g) calculating another level of interference for the other resultant waveform.

4. The method of claim 1, wherein the resultant waveform preserves phase continuity.

5. A computer-readable medium having computer-executable instructions for performing:

(a) determining a transition time between a previous designated frequency and a current designated frequency, wherein the current designated frequency is indicative of a pending symbol of information;

(b) calculating a first intermediate frequency that is between the previous designated frequency and the current designated frequency;

(c) constructing a resultant waveform, wherein the resultant waveform is associated with the first intermediate frequency during the transition time; and (d) calculating a level of interference for the resultant waveform in an adjacent wireless channel for a frequency modulated (FM) signal that conveys information from a wireless peripheral device.

6. The computer-readable medium of claim 5, wherein the pending symbol corresponds to a pending information bit.

7. The computer-readable medium of claim 5, further comprising:

(e) if the level of interference is greater than an acceptable level, calculating another intermediate frequency;

(f) constructing another resultant waveform, wherein the other resultant waveform is associated with the first intermediate frequency and the other intermediate frequency for a portion of the transition time; and (g) calculating another level of interference for the other resultant waveform.

8. The computer-readable medium of claim 5, wherein the resultant waveform preserves phase continuity.

* * * * *